(12) United States Patent
Vukich et al.

(10) Patent No.: US 10,325,079 B1
(45) Date of Patent: Jun. 18, 2019

(54) VERSION MANAGEMENT PLATFORM

(71) Applicant: Capital One Services, LLC., McLean, VA (US)

(72) Inventors: Adam Vukich, Alexandria, VA (US); Abdelkadar M'Hamed Benkreira, Washington, DC (US); Mykhaylo Bulgakov, Arlington, VA (US); Joshua Edwards, Philadelphia, PA (US); William Carroll, Huntingtown, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/209,251

(22) Filed: Dec. 4, 2018

(51) Int. Cl.
*G06F 21/12* (2013.01)
*G06F 21/62* (2013.01)
*H04L 9/06* (2006.01)

(52) U.S. Cl.
CPC .......... *G06F 21/121* (2013.01); *G06F 21/629* (2013.01); *H04L 9/0637* (2013.01); *G06F 2221/0704* (2013.01); *G06F 2221/0744* (2013.01); *G06F 2221/0753* (2013.01); *H04L 2209/38* (2013.01)

(58) Field of Classification Search
CPC ..... G06F 21/121; G06F 21/629; H04L 9/0637
USPC .......................................................... 726/29
See application file for complete search history.

(56) References Cited

U.S. PATENT DOCUMENTS

| | | | |
|---|---|---|---|
| 2015/0227890 A1* | 8/2015 | Bednarek | G06Q 10/08355 705/26.81 |
| 2016/0323109 A1* | 11/2016 | McCoy | G06Q 50/184 |
| 2017/0287090 A1* | 10/2017 | Hunn | G06Q 50/18 |
| 2018/0078843 A1* | 3/2018 | Tran | A63B 71/145 |
| 2018/0082023 A1* | 3/2018 | Curbera | H04L 9/3236 |
| 2018/0082024 A1* | 3/2018 | Curbera | H04L 9/3236 |
| 2018/0089256 A1 | 3/2018 | Wright, Sr. | |
| 2018/0189732 A1 | 6/2018 | Kozloski et al. | |
| 2018/0204213 A1* | 7/2018 | Zappier | H04L 63/08 |
| 2018/0218454 A1* | 8/2018 | Simon | G06Q 40/08 |
| 2018/0225661 A1* | 8/2018 | Russinovich | H04L 63/0435 |
| 2018/0260121 A1 | 9/2018 | Wisnovsky | |
| 2018/0260171 A1* | 9/2018 | Inoda | G06K 15/1842 |
| 2018/0268506 A1* | 9/2018 | Wodetzki | G06K 9/00456 |
| 2018/0309567 A1* | 10/2018 | Wooden | H04L 9/06 |
| 2019/0028277 A1* | 1/2019 | Jayachandran | H04L 9/3247 |

* cited by examiner

*Primary Examiner* — Dant B Shaifer Harriman
(74) *Attorney, Agent, or Firm* — Harrity & Harrity, LLP

(57) ABSTRACT

A node, of a network of nodes with access to a distributed ledger, receives a request to verify the user has consented to a current version of terms (i.e., current terms) associated with a program. The node obtains, using the distributed ledger, historical consent data indicating a version of the terms to which the user has previously provided consent. The node performs a first verification procedure to determine the user has not consented to the current terms, provides an indication to a user device that the user has not consented to the current terms, and receives, from the user device, a message indicating an acceptance of the current terms. The node performs additional verification procedures to determine that the user is who consented to the current terms and updates the distributed ledger to include a record indicating that the user consented to the current terms.

20 Claims, 9 Drawing Sheets

VERSION MANAGEMENT PLATFORM

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some possible implementations, a method may include receiving, by a node, a request to verify that a user has consented to a current version of one or more terms associated with a program. The node may be part of a network of nodes that have access to a distributed ledger that is used for managing a version control operation of the program. The request may include at least one of: an identifier associated with the user or a program identifier of the program. The method may include obtaining, by the node and by referencing the distributed ledger, historical consent data indicating a particular version of the one or more terms to which the user has previously provided consent. The method may include performing, by the node, a first verification procedure to determine that the user has not consented to the current version of the one or more terms associated with the program. The first verification procedure may include determining that the current version of the one or more terms is different than the particular version of the one or more terms to which the user has previously provided consent. The method may include providing, by the node and to a user device, an indication that the user has not consented to the current version of the one or more terms to cause an interface of the user device to display the current version of the one or more terms in a manner capable of being accepted by the user. The indication may cause the user device to restrict access to the program. The method may include receiving, by the node and from the user device, a message indicating an acceptance of the current version of the one or more terms. The method may include performing, by the node and after receiving the message, a second verification procedure to determine that the user is who consented to the current version of the one or more terms. The method may include adding, by the node and to the distributed ledger, a record indicating that the user consented to the current version of the one or more terms. The method may include providing, by the node and based on determining that the user is who consented to the current version of the one or more terms, a key to the user device that allows the user device to permit access to the program.

According to some possible implementations, a node may include one or more memories, and one or more processors, operatively coupled to the one or more memories, to: receive a request to verify that a user has consented to a current version of terms associated with a program. The node may be part of a network of nodes that have access to a distributed ledger that is used for managing version control of the program. The request may include an identifier associated with the user. The one or more processors may obtain, using the distributed ledger, historical consent data indicating one or more versions of the terms to which the user has previously provided consent. The one or more processors may perform a first verification procedure to determine that the user has not consented to the current version of the terms. The first verification procedure may include determining that the current version of the terms is different than the one or more versions of the terms to which the user has previously provided consent. The one or more processors may provide, to a user device, an indication that the user has not consented to the current version of terms to cause an interface of the user device to display the current version of the terms in a manner capable of being accepted by the user. The one or more processors may receive, from the user device, a message indicating an acceptance of the current version of the terms. The one or more processors may perform, after receiving the message, one or more additional verification procedures to determine that the user is who consented to the current version of the terms. The one or more additional verification procedures may include at least one of: a second verification procedure to verify that the user device is linked to a user profile of the user or a third verification procedure to verify that the user interacted with or authorized an interaction with the interface of the user device that accepted the current version of the terms. The one or more processors may update the distributed ledger to include a record indicating that the user consented to the current version of the terms.

According to some possible implementations, a non-transitory computer-readable medium may store instructions that include one or more instructions that, when executed by one or more processors of a node, cause the one or more processors to: receive, from a user device, a request to verify that a user, of a group of authorized users of an account, has consented to a current version of terms associated with a program. The node may be part of a network of nodes that have access to a distributed ledger that is used for managing version control of the program. The request may include an identifier associated with the account. The one or more instructions may cause the one or more processors to obtain, using the distributed ledger, historical consent data indicating one or more versions of the terms to which the group of authorized users have previously provided consent. The one or more instructions may cause the one or more processors to perform a first verification procedure to determine that the user device that provided the request is linked to a user profile of the user. The one or more instructions may cause the one or more processors to perform, using the historical consent data associated with the user, a second verification procedure to determine that the user has not consented to the current version of the terms. The second verification procedure may include determining that the current version of the terms is different than the one or more versions of the terms to which the group of authorized users have previously provided consent. The one or more instructions may cause the one or more processors to provide, to the user device, an indication that the user has not consented to the current version of the terms to cause an interface of the user device to display the current version of the terms in a manner capable of being accepted by the user. The one or more instructions may cause the one or more processors to receive, from the user device, a message indicating an acceptance of the current version of the terms. The one or more instructions may cause the one or more processors to perform, after receiving the message, one or more additional verification procedures to determine that the user is who consented to the current version of the terms. The one or more additional verification procedures may verify that the user interacted with or authorized an interaction with the interface of the user device that accepted the current version of the terms. The one or more instructions may cause the one or more processors to provide, to the user device and based on determining that the user is who consented to the current version of the terms, a notification indicating that the user consented to the current version of the terms to cause the user device to allow access to the program.

DETAILED DESCRIPTION

Figure 1A:
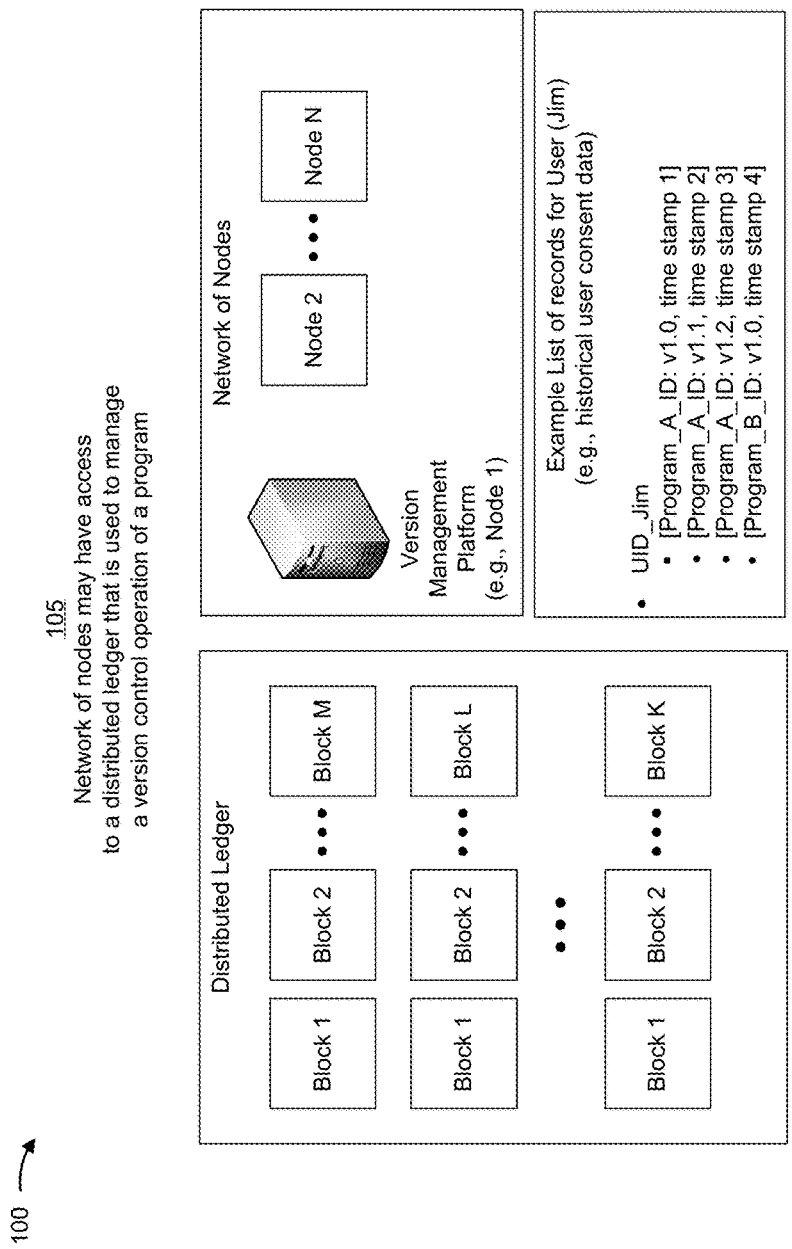
FIGS. 1A-1D are diagrams of an example implementation described herein.

The following detailed description of example implementations refers to the accompanying drawings. The same reference numbers in different drawings may identify the same or similar elements.

A program may have terms (e.g., terms of service, such as terms of use, terms and conditions, and/or the like, terms associated with a feature of the program, terms associated with a function of the program, and/or the like) that users must abide by when utilizing a service provided by the program. In some cases, when a user interacts with a user device to install and/or launch the program, the user may be prompted to consent to the terms (e.g., via a pop-up displayed on a user interface).

Over time, new versions of the terms of the program may be released. In some cases, the program may not prompt the user to consent each time a new version of the terms is released. As such, the user may not have provided consent to terms that have been added, removed, and/or modified. Furthermore, an organization that manages a large number of programs may have even greater difficulty managing user consent to terms of programs if the organization does not adhere to a uniform standard that restricts a way in which programs may obtain consent from users.

Additionally, identification of the user that is providing consent and/or proof that the user provided consent may be difficult. For example, if an individual interacts with a user device to accept terms of a program, and data indicating acceptance of the terms is provided to a backend server, the backend server may be unable to determine whether the individual is an authorized user that is permitted to access the program or a rogue user that may be logging into the program without knowledge or consent of the authorized user. As another example, if the program provides a service to a household, two or more members of the household may share login credentials to an account used to access the service. As such, if one user consents to the terms, the backend server may be unable to determine which user in the household provided the consent.

Some implementations described herein provide a network of nodes with access to a distributed ledger that is used for managing a version control operation of a program, and provide a first node (e.g., a version management platform) to use the distributed ledger and a group of verification procedures to ensure that a user has consented to a current version of terms associated with the program. For example, the user may interact with a user device to input login credentials for the program. This may cause the user device to provide, to the version management platform, a request to verify that the user has consented to the current version of the terms (e.g., terms of service). In this case, the version management platform may interact with a smart contract associated with the user, that is stored as part of the distributed ledger, to obtain historical consent data indicating a most recent version of the terms to which the user has previously provided consent.

In some implementations, the version management platform may perform a first verification procedure to determine whether the most recent version of the terms to which the user has provided consent is the current version of the terms. For example, it may be determined that the most recent version of the terms to which the user has provided consent is not the current version of the terms. In this case, the version management platform may provide, to the user device, an indication that the user has not consented to the current version of the terms. This may cause the user device to restrict access to the program or certain functionality of the program and to provide the current version of the terms for display on a user interface. Additionally, when the user interacts with the user interface to accept the current version of the terms, a message indicating acceptance of the current version of the terms may be provided to the version management platform.

In some implementations, the version management platform may perform one or more additional verification procedures to determine that the user is who consented to the current version of the terms. For example, while the version management platform may have received the message indicating the acceptance of the current version of the terms, the version management platform may need to perform one or more additional verification procedures to identify or prove that the user accepted the terms (e.g., and not an unauthorized user or another authorized user if the account is shared between multiple users). Furthermore, the version management platform may update the distributed ledger with a record indicating that the user consented to the terms and may provide, to the user device, an indication the user is permitted to access the program, a key that allows the user device to permit the user to access the program, and/or the like.

In this way, the version management platform ensures that the user has consented to the current version of the terms associated with the program. Furthermore, using the distributed ledger allows the version management platform to manage version control of the terms in a manner that is flexible, secure, distributed, and automated. For example, flexibility is provided by enabling execution of a smart contract that may be applied to a specific individual (e.g., the user), to individuals associated with an account, to a specific demographic of individuals, and/or the like.

Additionally, security is provided by implementing or supporting the distributed ledger with a tamper-resistant data structure (e.g., a blockchain), by implementing one or more forms of encryption, by restricting access to the distributed ledger to particular parties, and/or the like. For example, the distributed ledger improves security by preserving an immutable record of all (or some) instances in which the user has provided consent to the terms of the program (e.g., the user may provide consent each time a new version of the terms is released), by using cryptographic links between blocks of the distributed ledger (e.g., reducing the potential for unauthorized tampering with records of the distributed ledger), and/or the like. Security is further improved as a result of devices that have access to the distributed ledger independently verifying each transaction that is added to the distributed ledger. Moreover, use of the distributed ledger also provides failover protection, in that the version management platform may fail, and another node in the network may take on responsibilities of the version management platform.

Furthermore, several different stages of the process for managing the version control of the program are automated, which may remove human subjectivity and waste from the process, and which may improve speed and efficiency of the process and conserve computing resources (e.g., processor resources, memory resources, and/or the like). For example, by using the distributed ledger to manage consent to terms of the program, the version management platform eliminates a need for a human to manually make determinations as to whether an individual has consented to the terms, determine which version of the terms the individual has provided consent, and/or the like. Additionally, implementations described herein use a rigorous, computerized process to perform tasks or roles that were not previously performed or were previously performed using subjective human intuition or input.

FIGS. 1A-1D are diagram of an example implementation 100 described herein. For example, example implementation 100 may include a network of nodes (shown as a version management platform that serves as a first node, a second node, . . . , an Nth node) and a user device. As shown in FIGS. 1A-1D, the version management platform may perform a group of verification procedures to ensure that a user has consented to a current version of terms associated with a program.

As shown in FIG. 1A, and by reference number 105, the network of nodes may have access to a distributed ledger that is used to manage a version control operation of the program. The version control operation may, in some cases, refer to an operation to verify whether the user has consented to the current version of the terms associated with the program. Terms, as used herein, may refer to terms of service (e.g., terms of use, terms and conditions, and/or the like), terms associated with a function and/or a function of the program (e.g., a term to consent to providing the program with access to personal information, a term to consent to providing the program with access to other features of the user device, etc.), and/or the like. To access the program, the user may be required to consent to the current version of the terms.

In some implementations, the distributed ledger may be implemented by a tamper-resistant data structure, such as a blockchain. A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. For example, the blocks in the blockchain may be encrypted using public keys, such that accessing a block would require using a private key to decrypt the block. Additionally, in some cases, the distributed ledger may correspond to a record of consensus with a cryptographic audit trail that is maintained and validated by a set of independent computers. This means that if a user adds a new block to the blockchain, each permitted user may have to independently update a separate copy of the blockchain and may have to independently verify that the separate copy of the blockchain matches the blockchain that has been modified to include the new block.

In some implementations, the distributed ledger may store historical consent data for a user. For example, over time, a user utilizing one or more services provided by the program may consent to one or more versions of the terms. In this case, a record of consent provided by the user may be stored via a list of records via the distributed ledger. The list of records may include historical consent data that includes a program identifier of the program associated with the terms, a version identifier indicating a version of the terms, a time stamp indicating a time at which the user provided consent to a particular version of the terms, an identifier associated with the user (e.g., a name of the user, a username, an account identifier of an account used to access the program, etc.), and/or the like.

As shown as an example, a user named Jim may have previously consented to three separate versions (shown as v1.0, v1.1, and v1.2) of terms of a first program (e.g., Program A) and may have consented to one version of terms of a second program (Program B). In this example, four records of the consent provided by the user may be stored as part of the distributed ledger.

In some implementations, the version management platform may generate a smart contract for the individual and may store the smart contract as a record of the distributed ledger. A smart contract, as used herein, may include program code, a series of executable instructions, and/or one or more functions to verify and/or determine whether an individual has consented to particular terms (as defined elsewhere herein), a most recent version to which the individual has provided consent, and/or the like. For example, the version management platform may generate a smart contract that includes an identifier of the individual (e.g., a name, a username, and/or the like) and/or one or more functions that allow the smart contract to verify whether a most recent version of the terms to which the user has previously provided consent is the current version of the terms, whether one or more of the group of verification procedures have succeeded (e.g., as described further herein), and/or the like.

As an example, the one or more functions of the smart contract may be configured to receive, as input, information included in the request (e.g., device information of the user device, a user identifier, a program identifier, a version indicator, etc.). The smart contract may use the program identifier and/or the version indicator to identify the current version of the terms of the program, and may use the user identifier to identify whether the user has consented to the current version of the terms (e.g., by referencing a data structure that associates the user identifier with the program identifier and an indication of which version of the program the user has provided consent). This may cause the smart contract to output values (e.g., true or false values, etc.) based on whether the user has accepted the current version of the terms of the program.

Additionally, or alternatively, the version management platform may generate a smart contract for a group of individuals (e.g., for users associated with a particular account), for a class of individuals, for a particular program associated with an individual, and/or the like. For example, the version management platform may generate a smart contract for an account that includes a first user and a second user. In some cases, the first user and the second user may share login credentials when accessing the program or an account associated with the program. In this case, the smart contract may be able to differentiate between the first user and the second user based on device information (e.g., each user may have a different device with a different IP address), based on an indicator provided in the request (e.g., users of a joint account may be prompted upon login to indicate which user is accessing the program), and/or the like. In this way, the version management platform is able to generate smart contracts that are tailored specifically to individuals, to groups of individuals, to products associated with individuals, and/or the like.

In this way, the version management platform is able to access the distributed ledger to manage a version control operation of the program.

Figure 1B:
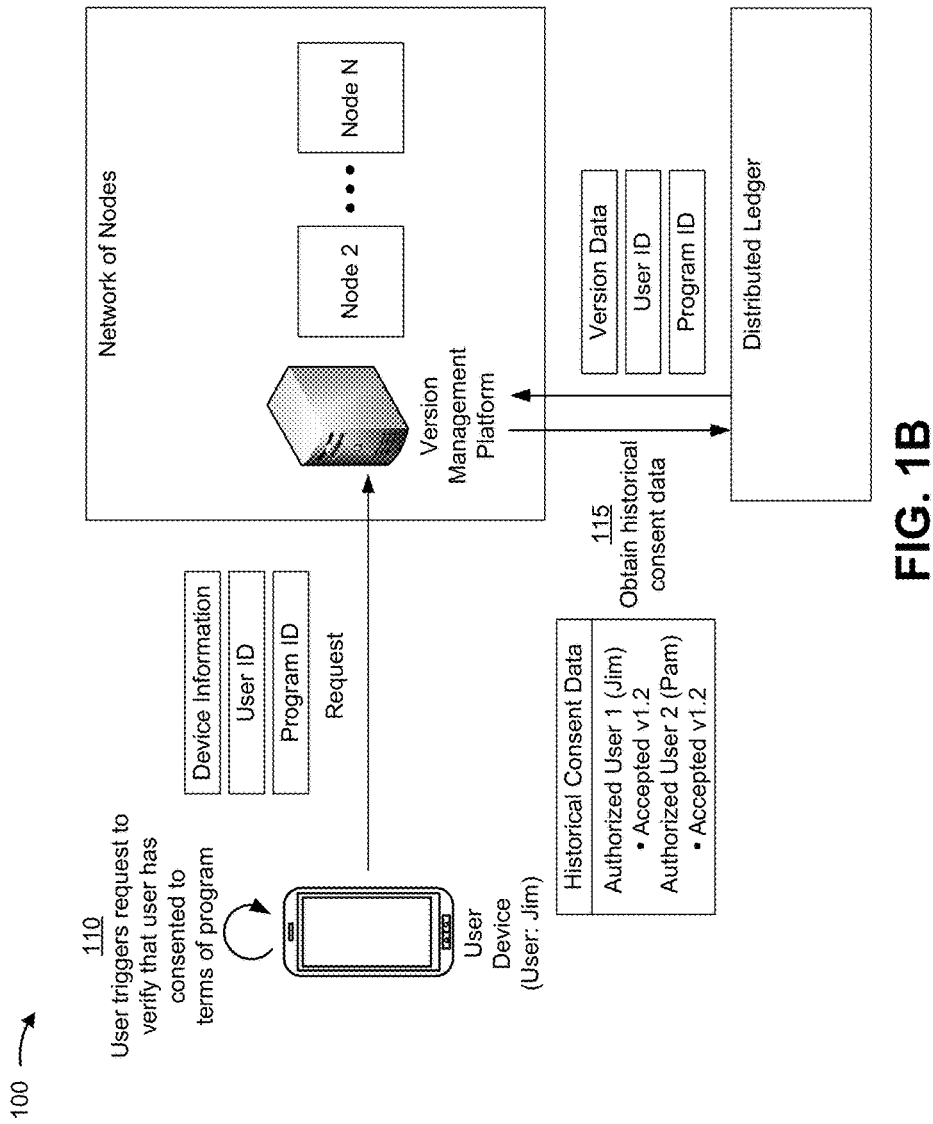

As shown in FIG. 1B, and by reference number 110, the user may trigger a request to verify that the user has consented to the current version of the terms of the program. For example, a login process performed by the user may trigger a request to verify that the user has consented to the current version of the terms. In this case, the user may interact with the user device to input login credentials for the program or to log in to an account associated with the program. When the user completes a login attempt, the user device may be configured to generate and provide the version management platform with the request. The request may be provided via a communication interface, such as an application programming interface (API) or a similar type of interface.

The request may include an identifier associated with the user (e.g., an account identifier for an account associated with the user, such as a username, an account ID, etc., a user identifier of the user, such as a name of the user, a phone number of the user, and/or the like), a program identifier for the program, device information identifying the user device or characteristics of the user device, and/or the like. The device information may include a network address (e.g., an internet protocol (IP) address, a media access control (MAC) address, and/or the like), an operating system identifier for a type of operating system used by the user device, a browser identifier associated with a type of web browser used by the user device, and/or the like. The device information may assist the version management platform in identifying which user has provided consent in situations where multiple users of an account share login credentials, as described further herein.

In some implementations, a different trigger may cause the user device to generate and provide the request to the version management platform. For example, the user device may generate and provide the request periodically (e.g., at a threshold time period), based on the user device launching the program, based on a new version of the terms being released, based on an indication that the user has yet to consent to the new version of the terms, and/or the like.

Additionally, or alternatively, a different trigger may cause the version management platform to verify that the user consented to the current version of the terms. For example, if an organization releases a new version of the terms (i.e., the current version of the terms), a device associated with the organization may provide the request and/or similar instructions to the version management platform that cause the version management platform to verify that the user consented to the new version of the terms (e.g., without the version management platform receiving the request from the user device). In some cases, an audit may be performed to verify whether the user consented to the current version of the terms. For example, the audit may cause the version management platform to identify a group of users that have not consented to the current version of the terms and to flag accounts associated with the group of users. The flag may cause the group of users to be prompted to consent to the current version upon their next login attempt, may cause the version management platform to send a message to the accounts associated with the group of users indicating that new terms are available and to be reviewed and accepted, and/or the like.

As shown by reference number 115, the version management platform may obtain the historical consent data. For example, the version management platform may use the identifier associated with the user to search the distributed ledger for the historical consent data of the user (e.g., which may be stored in association with a corresponding identifier associated with the user).

In some implementations, the version management platform may obtain the historical consent data by referencing a smart contract associated with the user. For example, the version management platform may use the identifier associated with the user to identify a location of the smart contract within the distributed ledger, and may provide, as input to the smart contract of the user, a program identifier for the program to cause the smart contract to output the historical consent data of the user for the program.

In some implementations, the version management platform may obtain the historical consent data of multiple users. For example, if the user shares an account with one or more other users and does not have unique login credentials to access the account, the version management platform may be unable to identify which user is interacting with the user device to access the program. As such, the version management platform may obtain the historical consent data of multiple users associated with the account.

As shown as an example, assume that a first user (Jim) shares an account with a second user (Pam) and that the two users share login credentials. In this case, the version management platform may reference the distributed ledger to obtain historical consent data for Jim and Pam. As shown, the historical consent data for Jim indicates that a most recent version of the terms to which Jim has provided consent is a second version (v1.2) of the terms. Additionally, the historical consent data for Pam indicates that a most recent version of the terms to which Pam has provided consent is also the second version (v1.2) of the terms.

In this way, the version management platform receives a request to verify that the user has consented to the current version of the terms of the program and obtains historical consent data that is to be used for determining whether the user has consented to the current version of the terms, as described further herein.

Figure 1C:
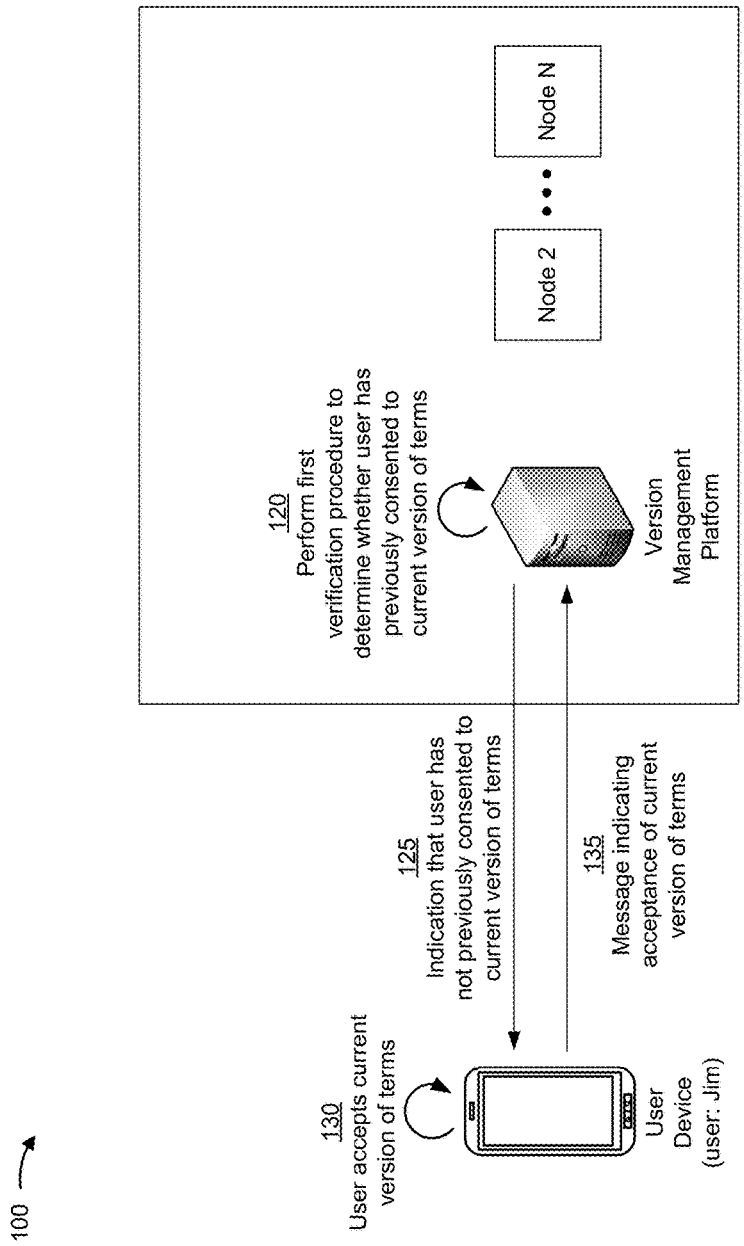

As shown in FIG. 1C, and by reference number 120, the version management platform may perform a first verification procedure to determine whether the user has previously consented to the current version of the terms. For example, the version management platform may perform the first verification procedure to determine whether the current version of the terms are the most recent terms to which the user provided consent. In this case, the version management platform may compare data identifying the current version of the terms and the historical consent data identifying the most recent version of the terms to which the user provided consent.

In some implementations, the version management platform may determine that the current version of the terms is the most recent version of the terms to which the user provided consent. In this case, the version management platform may provide, to the user device, an indication that the user has consented to the current version of the terms. This may allow the user device to permit the user to access the program.

In some implementations, the version management platform may determine that the current version of the terms is not the most recent version of the terms to which the user has provided consent. In this case, the version management platform may provide, to the user device, an indication that the user has not consented to the current version of the terms.

In some implementations, before performing the first verification procedure, the version management platform may perform a preliminary verification procedure. For example, if the version management platform obtains historical consent data for multiple users and/or is to verify consent of a user that shares an account and/or login credentials with other users, the version management platform may perform a preliminary verification procedure to attempt to determine which of the multiple users is accessing the user device. In this case, the version management platform may have access to user profile information for the multiple users, which may, in some cases, include device information for preferred devices of users. This may allow the version management platform to determine whether the user device that provided the request is a preferred device of a particular user, is linked to a user profile of the particular user, and/or the like.

As an example, assume a first user and a second user share an account and/or login credentials needed to access the program. In this example, the version management platform may identify device information of the user device (e.g., which may have been provided in the request) and may compare the device information and corresponding device information included in one or more user profiles that are specific to particular users. For example, if the first user has a preferred device with a first network address and the second user has a preferred device with a second network address, the version management platform may be able to identify which user is accessing the program. This may allow the version management platform to identify which historical consent data to use when performing the first verification procedure (e.g., historical consent data of the first user or historical consent data of the second user). If the device information preliminary verification procedure succeeds, the version management platform may perform the first verification procedure as described above. If the preliminary verification procedure fails, the version management platform may perform one or more of the additional verification procedures that are described in connection with FIG. 1D.

As shown by reference number 125, the version management platform may provide, to the user device, an indication that the user has not previously consented to the current version of the terms of the program. This may cause the user device to provide, for display on a user device, the terms in a manner that is capable of being accepted by the user.

In some implementations, the user device may be configured to restrict access to the program based on receiving the indication. For example, the user device may be configured to restrict access to the program until the user provides consent to the current version of the terms of the program, until the user device receives permission from the version management platform to permit the user to access to the program, and/or the like.

As shown by reference number 130, the user may interact with the user device to accept and consent to the current version of the terms. For example, the user may select or check a box that is located at a bottom portion of the terms to indicate that the user has read and agrees to the terms, may agree to the terms by inputting initials of the user, may agree to the terms by inputting an electronic signature, and/or the like.

As shown by reference number 135, when the user accepts the current version of the terms, the user device may generate and/or provide the version management platform with a message indicating an acceptance of the current version of the terms. In some implementations, the user device may provide the version management platform with a message that includes identification data. For example, the user device may be configured to capture identification data of the user when the user accepts the current version of the terms. The identification data may be used to perform one or more additional verification procedures, as described further herein. The identification data may include data identifying a fingerprint of the user, data identifying a face of the user, and/or the like.

As an example, the program may display the current version of the terms in a manner that requires the user to accept via a touchscreen action, such as by touching the screen to select a box to agree to the current version of the terms, touching the screen to input initials or a signature of the user, and/or the like. This may cause data identifying a fingerprint of the user to be provided to the version management platform. As another example, the program may be configured to take a screenshot of the user at a time when the user is accepting the current version of the terms. This may cause data identifying an image of the user to be provided to the version management platform. A similar embodiment may be provided using audio data (e.g., by recording an oral statement made by the user).

In this way, the version management platform causes the user device to display the terms of the current version of the terms to allow the user to accept the current version of the terms.

Figure 1D:
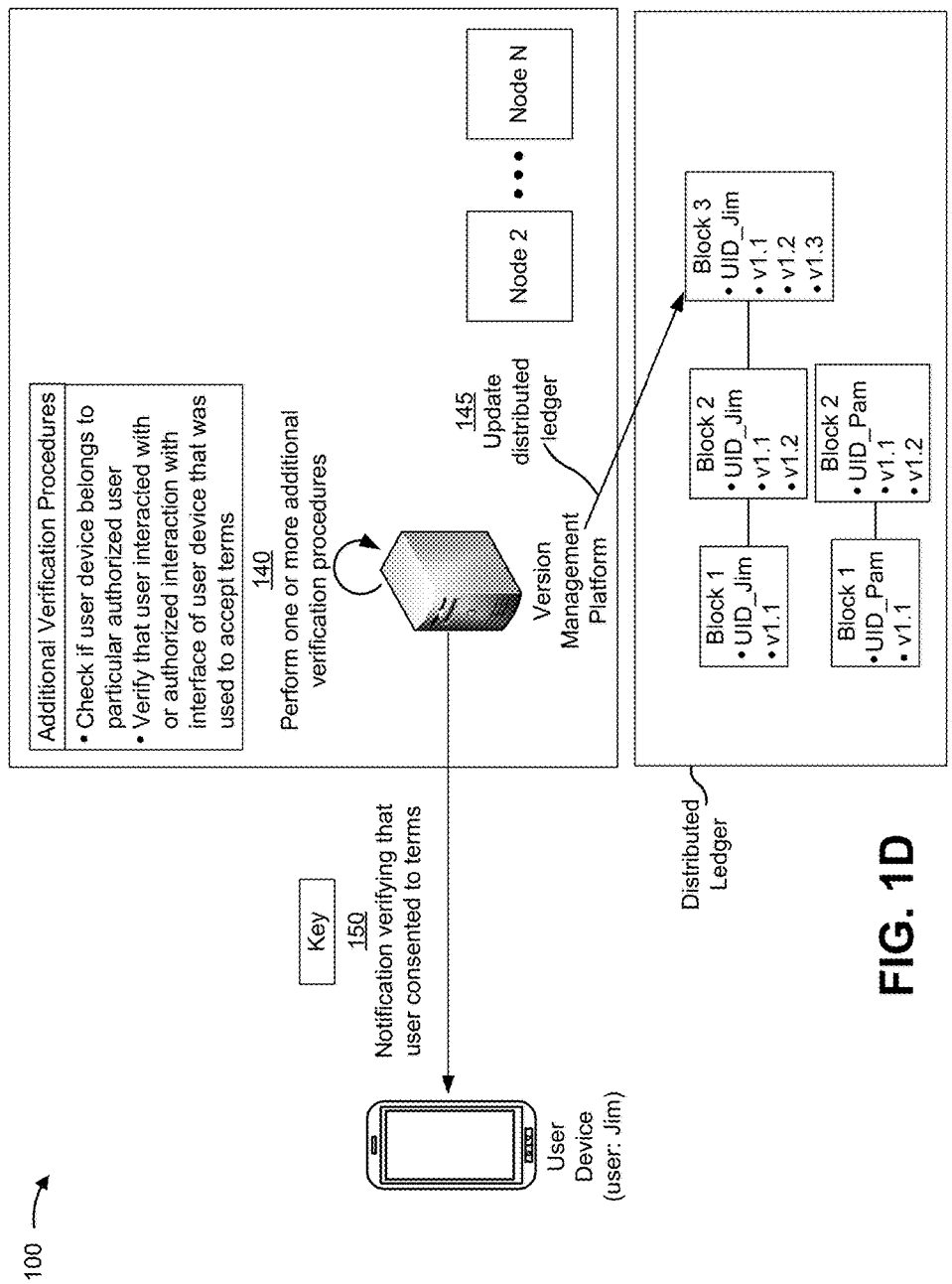

As shown in FIG. 1D, and by reference number 140, the version management platform may perform one or more additional verification procedures. For example, the version management platform may perform an additional verification procedure to verify that the user device is a preferred user device (and/or is linked to the user profile of the user), an additional verification procedure to verify that the user interacted with or authorized an interaction with the interface of the user device that was used to accept the current version of the terms, and/or the like.

In some implementations, the version management platform may verify that the user device is the preferred user device (and/or is linked to the user profile of the user). For example, if the version management platform has not previously performed the preliminary verification procedure described in connection with FIG. 1C, the version management platform may perform the preliminary verification procedure to verify that the user device is a preferred user device (and/or is linked to the user profile of the user).

Additionally, or alternatively, the version management platform may verify that the user interacted with or authorized an interaction with the interface of the user device that was used to accept the current version of the terms. For example, assume the message indicating the acceptance of the terms includes identification data of an individual that accepted the terms (e.g., data identifying fingerprints of the individual, data identifying a face of the individual, and/or the like). In this case, the version management platform may compare the identification data of the individual and configured identification data that identifies the user and may determine that the identification data satisfies a threshold level of similarity with the configured identification data. As such, the version management platform may, based on determining that the user interacted with the interface that was used to accept the current version of the terms, determine that the user consented to the current version of the terms.

Additionally, or alternatively, and provided as another example, the version management platform may provide, to the user device or to a particular account associated with the user (e.g., an electronic mailing account, etc.), a verification request message to confirm that the message indicating the acceptance of the current version of the terms was provided by the user. This may cause the user device or another device accessible to the user to provide, to the version management platform, a verification response message confirming that that the message indicating the acceptance of the terms was provided by the user.

In some implementations, the version management platform may perform one or more of the additional verification procedures based on a condition. For example, the version management platform may perform an additional verification procedure if the first verification procedure does not succeed, may perform the additional verification procedure if the preliminary verification procedure does not succeed, may perform the additional verification procedure if the user shares an account and/or login credentials with one or more other users, may perform a second additional verification procedure if a first additional verification procedure does not succeed, and/or the like. Additionally, or alternatively, the version management platform may perform one or more of the additional verification procedures based on a rule. For example, the version management platform may perform an additional verification procedure for a particular user, for a particular account, for a particular program, at a particular time period, and/or the like.

As shown by reference number 145, the version management platform may update the distributed ledger. For example, the version management platform may add a record to the distributed ledger indicating that the user consented to the current version of the terms of the program. In some implementations, the version management platform may add a record indicating a result of one or more of the group of verification procedures described herein. In some implementations, the version management platform may add a record indicating a degree of confidence that the user is who accepted the current version of the terms of the program.

In some implementations, the version management platform may broadcast an update to the network of nodes. For example, the version management platform may broadcast an update to the network of nodes when a change is made to the distributed ledger (e.g., when a record is added). As such, the other nodes, which may have access to independent copies of the distributed ledger, may modify the copies of the distributed ledger to account for the change (e.g., by adding a copy of the record that is being added to the copy of the distributed ledger). In this way, nodes may independently verify each record that is added to the distributed ledger, thereby improving security and providing failover protection (e.g., if the first node fails, another node may become the master node and may use the copy of the blockchain to perform one or more functions of the master node).

As shown by reference number 150, the version management platform may provide, to the user device, a notification verifying that the user consented to the current version of the terms of the program. For example, the version management platform may use a communication interface, such as an application programming interface (API), to notify the user device that the user has consented to the current version of the terms of the program. Additionally, or alternatively, the API may be used to grant the user with access to the program. For example, the program may have restricted access until the user provides consent, and, after the user provides consent to the current version of the terms, the API may be used to remove the restricted access to the program (e.g., user device may make an API call to the version management platform to request that the restricted access be removed, or the version management platform may make an API call to the user device to automatically remove the restricted access).

In some implementations, the version management platform may provide the user device with a key that allows the user device to permit the user to access the program. For example, when the version management platform provided the user device with the indication that the user has not previously consented to the current version of the terms, the indication may have caused the user device to restrict access to the program. Additionally, the version management platform may provide the user device with the key, which the user device may use to allow the user to access the program (e.g., the key may unlock the program, un-restrict access to the program, etc.).

As an example, the program may include a security feature that locks the program (or an aspect of the program) upon receiving an indication that the user has not previously consented to the current version of the terms. In this example, the version management platform may provide the user device with a key which may unlock the program, un-restrict access to the program, and/or the like.

In other cases, the program may lock down based on another type of trigger. For example, when a new version is released and downloaded to the user device, the new version of the program may have a configuration that locks the program until the user provides updated consent.

In some implementations, the user device may store a local record of the notification verifying that the user consented to the terms. This may allow the user device to reference the local record when determining whether to generate a subsequent request to verify whether the user has consented to the current version of the terms of the program.

In this way, the version management platform ensures that the user has consented to the current version of the terms associated with the program. Additionally, by identifying which users consent to the current version of the terms, the version management platform conserves resources (e.g., processing resources, network resources, memory resources, and/or the like) that would otherwise be used to needlessly offer the terms to users that have already provided consent, optimizes use of resources by ensuring that resources expended are used to obtain consent from users that have yet to provide consent, and/or the like. Furthermore, using the distributed ledger allows the version management platform to manage version control of the terms in a manner that is flexible, secure, distributed, and automated. Moreover, by providing cryptographically secure proof of user consent to terms, the version management platform reduces risk of litigation (e.g., thereby conserving resources that would otherwise be used during a litigation procedure).

As indicated above, FIGS. 1A-1D are provided merely as an example. Other examples are possible and may differ from what was described with regard to FIGS. 1A-1D. For example, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2:
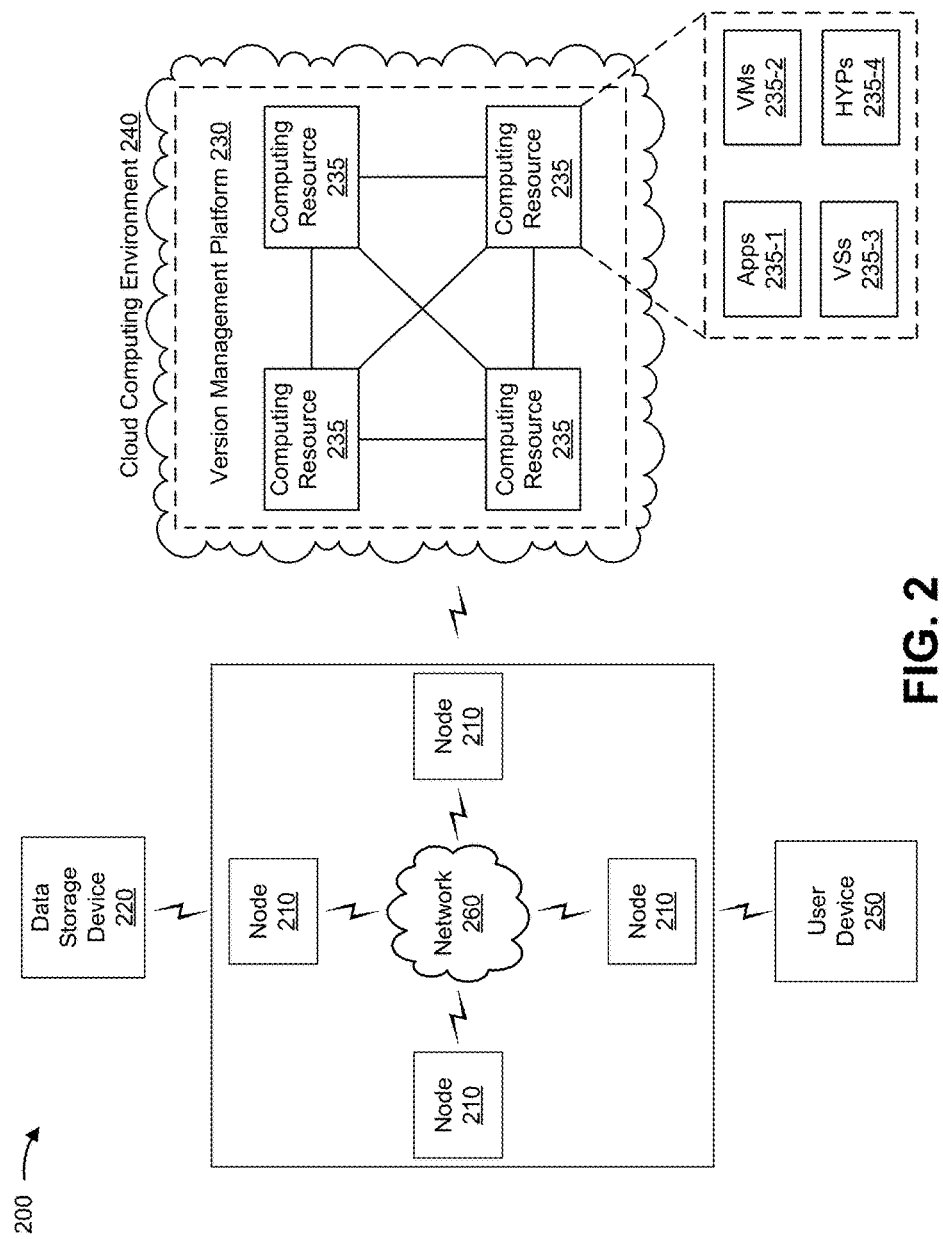
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a group of nodes 210, a data storage device 220, a version management platform 230 hosted within a cloud computing environment 240, a user device 250, and/or a network 260. Devices of environment 200 may interconnect via wired connections, wireless connections, or a combination of wired and wireless connections.

Node 210 includes one or more devices capable of receiving, generating, storing, processing, and/or providing information associated with terms of a program. For example, node 210 may include a computing device (e.g., a desktop computer, a laptop computer, a tablet computer, a handheld computer, a server device, etc.), a mobile phone (e.g., a smart phone, a radiotelephone, etc.), or a similar device.

In some implementations, a group of nodes 210 may be part of a network that is able to utilize a distributed ledger to securely share historical user consent data. In some implementations, node 210 may be a device associated with an entity, such as an organization, a subsidiary of the organization, an individual, and/or the like. In some implementations, a group of nodes 210 may include nodes 210 that are associated with multiple organizations, multiple subsidiaries of an organization, multiple individuals, and/or the like.

Data storage device 220 includes one or more devices capable of receiving, generating, storing, processing, and/or providing information associated with terms of a program. For example, data storage device 220 may include a computing device, such as a server, a desktop computer, a laptop computer, a tablet computer, a handheld computer, or a similar device. In some implementations, data storage device 220 may support a tamper-resistant data structure (e.g., a blockchain) that stores historical user consent data.

Version management platform 230 includes one or more devices capable of receiving, generating, storing, processing, and/or providing information associated with terms of a program. For example, version management platform 230 may include a server device (e.g., a host server, a web server, an application server, etc.), a data center device, or a similar device.

In some implementations, version management platform 230 may perform one or more actions described as being performed by node 210. In some implementations, version management platform 230 may serve as a master node or a management node for a group of nodes 210. In some implementations, version management platform 230 may be separate from the group of nodes 210 but may interact with the group of nodes 210. In some implementations, version management platform 230 may generate a smart contract for an individual or a group of individuals. In some implementations, version management platform 230 may interact with user device 250 to service a request to verify that a user has consented to a current version of the terms of the program.

In some implementations, as shown, version management platform 230 may be hosted in cloud computing environment 240. Notably, while implementations described herein describe version management platform 230 as being hosted in cloud computing environment 240, in some implementations, version management platform 230 may not be cloud-based (i.e., may be implemented outside of a cloud computing environment) or may be partially cloud-based.

Cloud computing environment 240 includes an environment that hosts version management platform 230. Cloud computing environment 240 may provide computation, software, data access, storage, etc. services that do not require end-user knowledge of a physical location and configuration of system(s) and/or device(s) that hosts version management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host version management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 may include one or more software applications that may be provided to or accessed by node 210, data storage device 220, and/or user device 250. Application 235-1 may eliminate a need to install and execute the software applications on these devices. For example, application 235-1 may include software associated with version management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., node 210, data storage device 220, and/or user device 250), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

User device 250 includes one or more devices capable of receiving, generating, storing, processing, and/or providing information associated with terms of a program. For example, user device 250 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 250 may be part of a group of nodes 210. In some implementations, user device 250 may host a program, and may interact with version management platform 230 to verify that a user has consented to a current version of the terms of the program. For example, user device 250 may interact with version management platform 230 using a communication interface, such as an application programming interface (API) or a similar type of interface.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
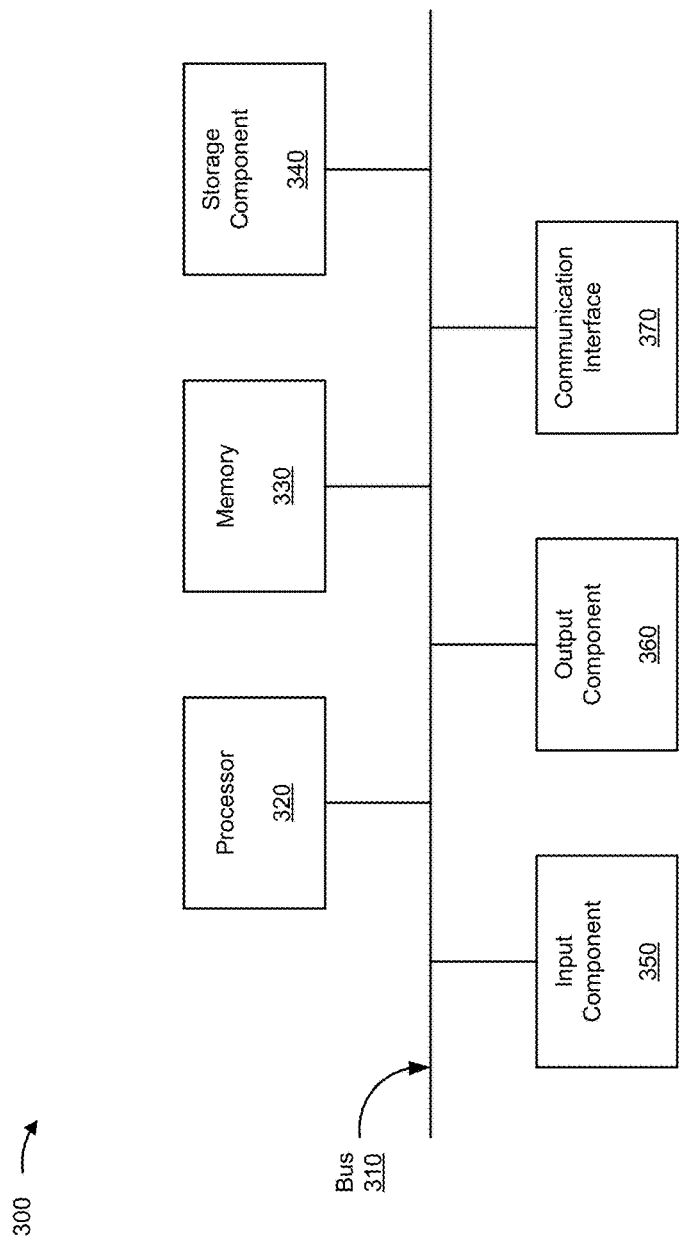
FIG. 3 is a diagram of example components of one or more devices of FIG. 2.

FIG. 3 is a diagram of example components of a device 300. Device 300 may correspond to node 210, data storage device 220, version management platform 230, computing resource 235, and/or user device 250. In some implementations, node 210, data storage device 220, version management platform 230, computing resource 235, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
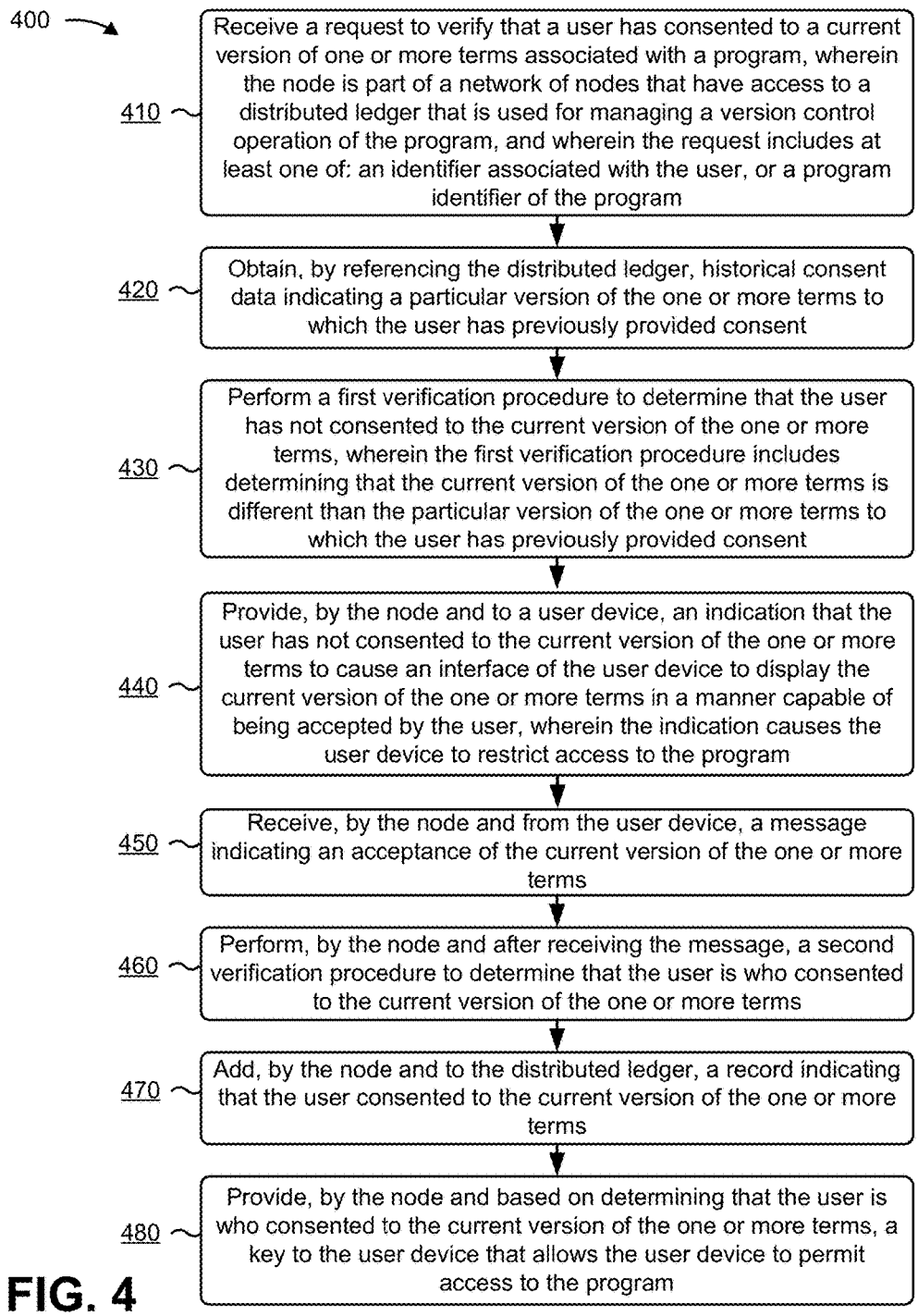
FIGS. 4-6 are flow charts of an example process for using a distributed ledger and a group of verification procedures to ensure that a user has consented to terms of a current version of a program.

FIG. 4 is a flow chart of an example process 400 for using a distributed ledger and a group of verification procedures to ensure that a user has consented to terms of a current version of a program. In some implementations, one or more process blocks of FIG. 4 may be performed by a version management platform (e.g., version management platform 230). In some implementations, one or more process blocks of FIG. 4 may be performed by another device or a group of devices separate from or including the version management platform, such as a node (e.g., node 210), a data storage device (e.g., data storage device 220), a user device (e.g., user device 250), and/or the like.

As shown in FIG. 4, process 400 may include receiving, by a node, a request to verify that a user has consented to a current version of one or more terms associated with a program, wherein the node is part of a network of nodes that have access to a distributed ledger that is used for managing version control of the program, and wherein the request includes at least one of an identifier associated with the user, or a program identifier of the program (block 410). For example, the version management platform (e.g., using computing resource 235, processor 320, memory 330, storage component 340, input component 350, communication interface 370, and/or the like) may receive, by a node, a request to verify that a user has consented to a current version of one or more terms associated with a program, as described above in connection with FIGS. 1A-1D. In some implementations, the node may be part of a network of nodes that have access to a distributed ledger that is used for managing version control of the program, and the request may include at least one of: an identifier associated with the user or a program identifier of the program.

As further shown in FIG. 4, process 400 may include obtaining, by the node and by referencing the distributed ledger, historical consent data indicating a particular version of the one or more terms to which the user has previously provided consent (block 420). For example, the version management platform (e.g., using computing resource 235, processor 320, memory 330, storage component 340, input component 350, communication interface 370, and/or the like) may obtain, by the node and by referencing the distributed ledger, historical consent data indicating a particular version of the one or more terms to which the user has previously provided consent, as described above in connection with FIGS. 1A-1D.

As further shown in FIG. 4, process 400 may include performing, by the node, a first verification procedure to determine that the user has not consented to the current version of the one or more terms, wherein the first verification procedure includes determining that the current version of the one or more terms is different than the particular version of the one or more terms to which the user has previously provided consent (block 430). For example, the version management platform (e.g., using computing resource 235, processor 320, memory 330, storage component 340, input component 350, communication interface 370, and/or the like) may perform, by the node, a first verification procedure to determine that the user has not consented to the current version of the one or more terms, as described above in connection with FIGS. 1A-1D. In some implementations, the first verification procedure may include determining that the current version of the one or more terms is different than the particular version of the one or more terms to which the user has previously provided consent.

As further shown in FIG. 4, process 400 may include providing, by the node and to a user device, an indication that the user has not consented to the current version of the one or more terms to cause an interface of the user device to display the current version of the one or more terms in a manner capable of being accepted by the user, wherein the indication causes the user device to restrict access to the program (block 440). For example, the version management platform (e.g., using computing resource 235, processor 320, memory 330, storage component 340, input component 350, communication interface 370, and/or the like) may provide, by the node and to a user device, an indication that the user has not consented to the current version of the one or more terms to cause an interface of the user device to display the current version of the one or more terms in a manner capable of being accepted by the user, as described above in connection with FIGS. 1A-1D. In some implementations, the indication may cause the user device to restrict access to the program.

As further shown in FIG. 4, process 400 may include receiving, by the node and from the user device, a message indicating an acceptance of the current version of the one or more terms (block 450). For example, the version management platform (e.g., using computing resource 235, processor 320, memory 330, storage component 340, input component 350, communication interface 370, and/or the like) may receive, by the node and from the user device, a message indicating an acceptance of the current version of the one or more terms, as described above in connection with FIGS. 1A-1D.

As further shown in FIG. 4, process 400 may include performing, by the node and after receiving the message, a second verification procedure to determine that the user is who consented to the current version of the one or more terms (block 460). For example, the version management platform (e.g., using computing resource 235, processor 320, memory 330, storage component 340, input component 350, communication interface 370, and/or the like) may perform, by the node and after receiving the message, a second verification procedure to determine that the user is who consented to the current version of the one or more terms, as described above in connection with FIGS. 1A-1D.

As further shown in FIG. 4, process 400 may include adding, by the node and to the distributed ledger, a record indicating that the user consented to the current version of the one or more terms (block 470). For example, the version management platform (e.g., using computing resource 235, processor 320, memory 330, storage component 340, input component 350, communication interface 370, and/or the like) may add, by the node and to the distributed ledger, a record indicating that the user consented to the current version of the one or more terms, as described above in connection with FIGS. 1A-1D.

As further shown in FIG. 4, process 400 may include providing, by the node and based on determining that the user is who consented to the current version of the one or more terms, a key to the user device that allows the user device to permit access to the program (block 480). For example, the version management platform (e.g., using computing resource 235, processor 320, memory 330, storage component 340, input component 350, communication interface 370, and/or the like) may provide, by the node and based on determining that the user is who consented to the current version of the one or more terms, a key to the user device that allows the user device to permit access to the program, as described above in connection with FIGS. 1A-1D.

Process 400 may include additional implementations, such as any single implementation or any combination of implementations described below and/or in connection with one or more other processes described elsewhere herein.

In some implementations, the current version of the one or more terms and the particular version of the one or more terms may be part of a terms of service (ToS) agreement for the program. In some implementations, the user may be a first user of an account and may share login credentials for the account with a second user. In some implementations, the distributed ledger may be implemented by a blockchain to provide secure, verifiable proof that the user consented to the current version of the one or more terms.

In some implementations, the request to verify that the user has consented to the current version of the one or more terms may include device information for the user device. In some implementations, when performing the second verification procedure, the version management platform may determine that the user device is linked to a user profile of the user based on the device information included in the request matching corresponding device information stored as part of the user profile. In some implementations, the version management platform may determine that the user consented to the current version of the one or more terms based on determining that the user device, which was used to provide the message indicating the acceptance of the current version of the one or more terms, is linked to the user profile of the user.

In some implementations, when receiving the message indicating the acceptance of the current version of the one or more terms, the version management platform may receive, as part of the message, first identification data of an individual that accepted the current version of the one or more terms. In some implementations, when performing the second verification procedure, the version management platform may determine that the first identification data satisfies a threshold level of similarity with second identification data that identifies the user. In some implementations, the version management platform may determine that the user consented to the current version of the one or more terms based on determining that the first identification data satisfies the threshold level of similarity with the second identification data.

In some implementations, when performing the second verification procedure, the version management platform may provide, to the user device or to a particular account associated with the user, a verification request message to confirm that the message indicating the acceptance of the current version of the one or more terms was provided by the user. In some implementations, the version management platform may receive, from the user device or another device, a verification response message confirming that the message indicating the acceptance of the current version of the one or more terms was provided by the user. In some implementations, the version management platform may determine that the user consented to the current version of the one or more terms based on receiving the verification response message confirming that the message indicating the acceptance of the current version of the one or more terms was provided by the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
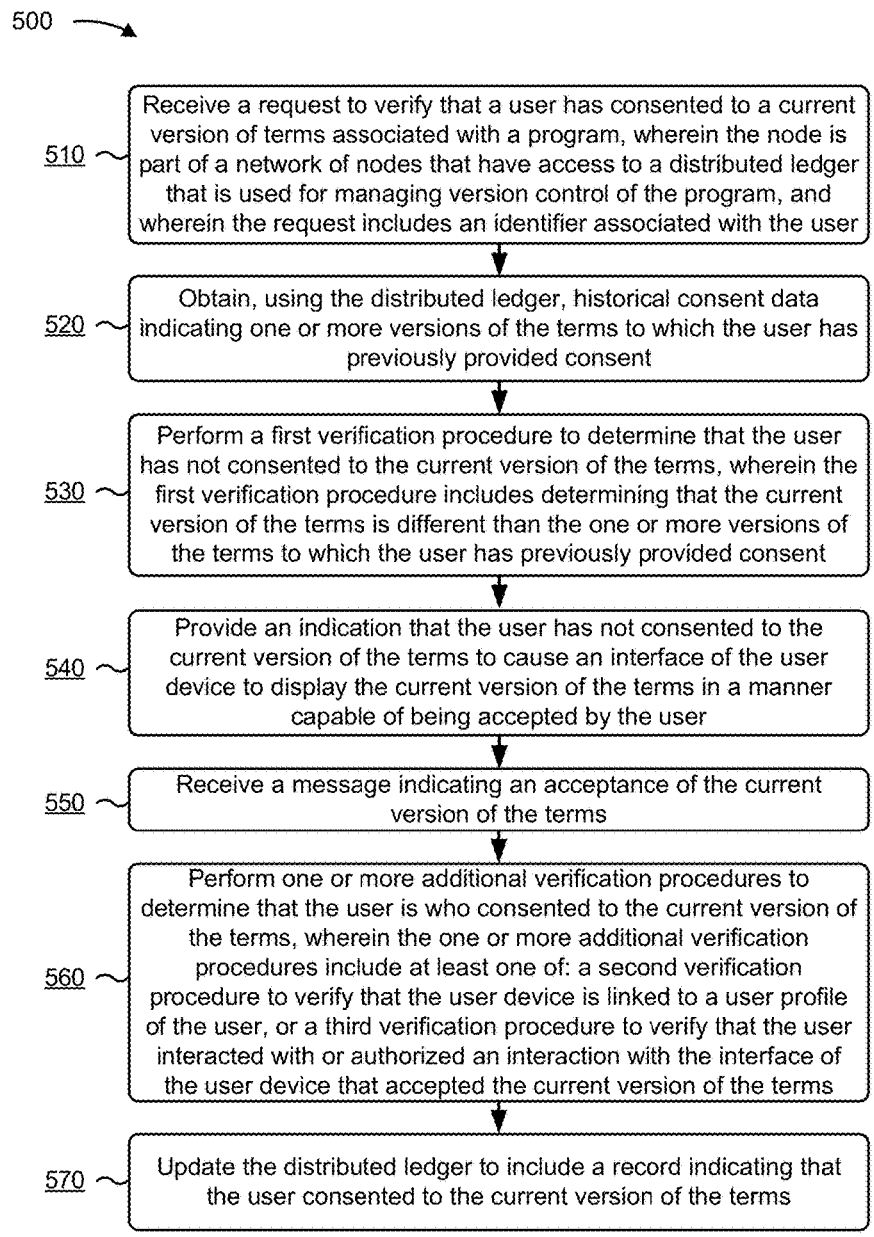

FIG. 5 is a flow chart of an example process 500 for using a distributed ledger and a group of verification procedures to ensure that a user has consented to terms of a current version of a program. In some implementations, one or more process blocks of FIG. 5 may be performed by a version management platform (e.g., version management platform 230). In some implementations, one or more process blocks of FIG. 5 may be performed by another device or a group of devices separate from or including the version management platform, such as a node (e.g., node 210), a data storage device (e.g., data storage device 220), a user device (e.g., user device 250), and/or the like.

As shown in FIG. 5, process 500 may include receiving a request to verify that a user has consented to a current version of terms associated with a program, wherein the node is part of a network of nodes that have access to a distributed ledger that is used for managing version control of the program, and wherein the request includes an identifier associated with the user (block 510). For example, the version management platform (e.g., using computing resource 235, processor 320, memory 330, storage component 340, input component 350, communication interface 370, and/or the like) may receive a request to verify that a user has consented to a current version of terms associated with a program, as described above in connection with FIGS. 1A-1D. In some implementations, the node may be part of a network of nodes that have access to a distributed ledger that is used for managing version control of the program, and the request may include an identifier associated with the user.

As further shown in FIG. 5, process 500 may include obtaining, using the distributed ledger, historical consent data indicating one or more versions of the terms to which the user has previously provided consent (block 520). For example, the version management platform (e.g., using computing resource 235, processor 320, memory 330, storage component 340, input component 350, communication interface 370, and/or the like) may obtain, using the distributed ledger, historical consent data indicating one or more versions of the terms to which the user has previously provided consent, as described above in connection with FIGS. 1A-1D.

As further shown in FIG. 5, process 500 may include performing a first verification procedure to determine that the user has not consented to the current version of the terms, wherein the first verification procedure includes determining that the current version of the terms is different than the one or more versions of the terms to which the user has previously provided consent (block 530). For example, the version management platform (e.g., using computing resource 235, processor 320, memory 330, storage component 340, input component 350, communication interface 370, and/or the like) may perform a first verification procedure to determine that the user has not consented to the current version of the terms, as described above in connection with FIGS. 1A-1D. In some implementations, the first verification procedure may include determining that the current version of the terms is different than the one or more versions of the terms to which the user has previously provided consent.

As further shown in FIG. 5, process 500 may include providing, to a user device, an indication that the user has not consented to the current version of the terms to cause an interface of the user device to display the current version of the terms in a manner capable of being accepted by the user (block 540). For example, the version management platform (e.g., using computing resource 235, processor 320, memory 330, storage component 340, input component 350, communication interface 370, and/or the like) may provide, to a user device, an indication that the user has not consented to the current version of the terms to cause an interface of the user device to display the current version of the terms in a manner capable of being accepted by the user, as described above in connection with FIGS. 1A-1D.

As further shown in FIG. 5, process 500 may include receiving, from the user device, a message indicating an acceptance of the current version of the terms (block 550). For example, the version management platform (e.g., using computing resource 235, processor 320, memory 330, storage component 340, input component 350, communication interface 370, and/or the like) may receive, from the user device, a message indicating an acceptance of the current version of the terms, as described above in connection with FIGS. 1A-1D.

As further shown in FIG. 5, process 500 may include performing, after receiving the message, one or more additional verification procedures to determine that the user is who consented to the current version of the terms, wherein the one or more additional verification procedures include at least one of: a second verification procedure to verify that the user device is linked to a user profile of the user, or a third verification procedure to verify that the user interacted with or authorized an interaction with the interface of the user device that accepted the current version of the terms (block 560). For example, the version management platform (e.g., using computing resource 235, processor 320, memory 330, storage component 340, input component 350, communication interface 370, and/or the like) may perform, after receiving the message, one or more additional verification procedures to determine that the user is who consented to the current version of the terms, as described above in connection with FIGS. 1A-1D. In some implementations, the one or more additional verification procedures may include at least one of: a second verification procedure to verify that the user device is linked to a user profile of the user, or a third verification procedure to verify that the user interacted with or authorized an interaction with the interface of the user device that accepted the current version of the terms.

As further shown in FIG. 5, process 500 may include updating the distributed ledger to include a record indicating that the user consented to the current version of the terms (block 570). For example, the version management platform (e.g., using computing resource 235, processor 320, memory 330, storage component 340, input component 350, communication interface 370, and/or the like) may update the distributed ledger to include a record indicating that the user consented to the current version of the terms, as described above in connection with FIGS. 1A-1D.

Process 500 may include additional implementations, such as any single implementation or any combination of implementations described below and/or in connection with one or more other processes described elsewhere herein.

In some implementations, the user may be a first user of an account and may share login credentials for the account with a second user. In some implementations, the request to verify that the user has consented to the current version of the terms may include device information for the user device. In some implementations, the version management platform, when performing the one or more additional verification procedures, may determine, as part of the second verification procedure, that the user device is linked to a user profile of the user based on the device information included in the request matching corresponding device information stored as part of the user profile. In some implementations, the version management platform, as part of the second verification procedure, may determine that the user consented to the current version of the terms based on determining that the user device is linked to the user profile of the user.

In some implementations, when receiving the message indicating the acceptance of the current version of the terms, the version management platform may receive, as part of the message, first identification data of an individual that accepted the current version of the terms. In some implementations, when performing the one or more additional verification procedures, the version management platform may determine, as part of the third verification procedure, that the first identification data satisfies a threshold level of similarity with second identification data that identifies the user. In some implementations, the version management platform may determine, as part of the third verification procedure, that the user consented to the current version of the terms based on determining that the first identification data satisfies the threshold level of similarity with the second identification data.

In some implementations, when performing the one or more additional verification procedures, the version management platform may provide, to the user device or to a particular account associated with the user and as part of the third verification procedure, a verification request message to confirm that the message indicating the acceptance of the current version of the terms was provided by the user. In some implementations, the version management platform may receive, from the user device or another device, a verification response message confirming that the message indicating the acceptance of the current version of the terms was provided by the user. In some implementations, the version management platform may determine, as part of the third verification procedure, that the user consented to the current version of the terms based on receiving the verification response message confirming that the message indicating the acceptance of the current version of the terms was provided by the user.

In some implementations, when performing the one or more additional verification procedures, the version management platform may perform the second verification procedure and may perform the third verification procedure only if the second verification procedure fails. In some implementations, the distributed ledger may be implemented by a tamper-resistant data structure to provide secure, verifiable proof that the user consented to the current version of the terms.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
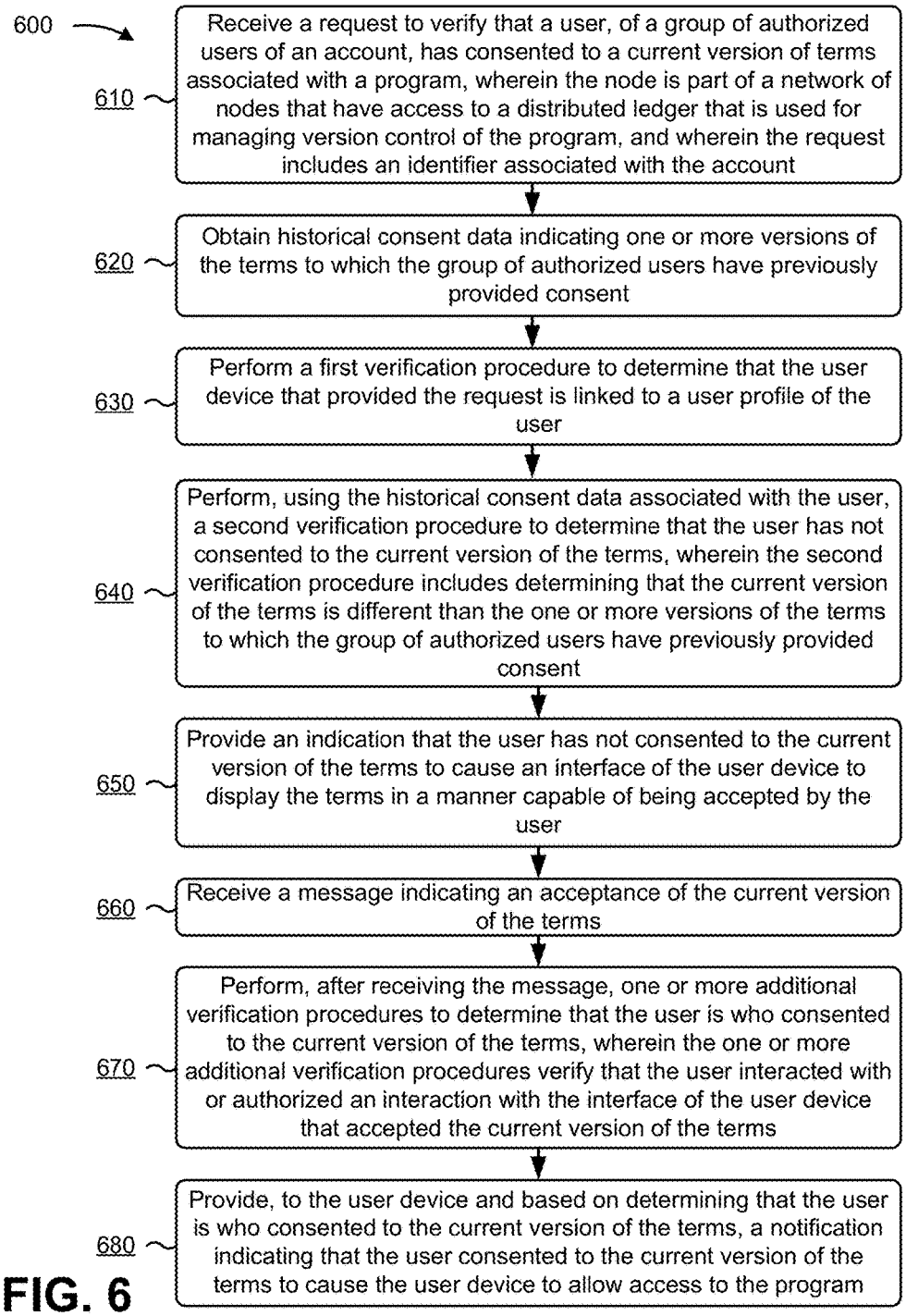

FIG. 6 is a flow chart of an example process 600 for using a distributed ledger and a group of verification procedures to ensure that a user has consented to terms of a current version of a program. In some implementations, one or more process blocks of FIG. 6 may be performed by a version management platform (e.g., version management platform 230). In some implementations, one or more process blocks of FIG. 6 may be performed by another device or a group of devices separate from or including the version management platform, such as a node (e.g., node 210), a data storage device (e.g., data storage device 220), a user device (e.g., user device 250), and/or the like.

As shown in FIG. 6, process 600 may include receiving, from a user device, a request to verify that a user, of a group of authorized users of an account, has consented to a current version of terms associated with a program, wherein the node is part of a network of nodes that have access to a distributed ledger that is used for managing version control of the program, and wherein the request includes an identifier associated with the account (block 610). For example, the version management platform (e.g., using computing resource 235, processor 320, memory 330, storage component 340, input component 350, communication interface 370, and/or the like) may receive, from a user device, a request to verify that a user, of a group of authorized users of an account, has consented to a current version of terms associated with a program, as described above in connection with FIGS. 1A-1D. In some implementations, the node may be part of a network of nodes that have access to a distributed ledger that is used for managing version control of the program, and the request may include an identifier associated with the account.

As further shown in FIG. 6, process 600 may include obtaining, using the distributed ledger, historical consent data indicating one or more versions of the terms to which the group of authorized users have previously provided consent (block 620). For example, the version management platform (e.g., using computing resource 235, processor 320, memory 330, storage component 340, input component 350, communication interface 370, and/or the like) may obtain, using the distributed ledger, historical consent data indicating one or more versions of the terms to which the group of authorized users have previously provided consent, as described above in connection with FIGS. 1A-1D.

As further shown in FIG. 6, process 600 may include performing a first verification procedure to determine that the user device that provided the request is linked to a user profile of the user (block 630). For example, the version management platform (e.g., using computing resource 235, processor 320, memory 330, storage component 340, input component 350, communication interface 370, and/or the like) may perform a first verification procedure to determine that the user device that provided the request is linked to a user profile of the user, as described above in connection with FIGS. 1A-1D.

As further shown in FIG. 6, process 600 may include performing, using the historical consent data associated with the user, a second verification procedure to determine that the user has not consented to the current version of the terms, wherein the second verification procedure includes determining that the current version of the terms is different than the one or more versions of the terms to which the group of authorized users have previously provided consent (block 640). For example, the version management platform (e.g., using computing resource 235, processor 320, memory 330, storage component 340, input component 350, communication interface 370, and/or the like) may perform, using the historical consent data associated with the user, a second verification procedure to determine that the user has not consented to the current version of the terms, as described above in connection with FIGS. 1A-1D. In some implementations, the second verification procedure may include determining that the current version of the terms is different than the one or more versions of the terms to which the group of authorized users have previously provided consent.

As further shown in FIG. 6, process 600 may include providing, to the user device, an indication that the user has not consented to the current version of the terms to cause an interface of the user device to display the current version of the terms in a manner capable of being accepted by the user (block 650). For example, the version management platform (e.g., using computing resource 235, processor 320, memory 330, storage component 340, input component 350, communication interface 370, and/or the like) may provide, to the user device, an indication that the user has not consented to the current version of the terms to cause an interface of the user device to display the current version of the terms in a manner capable of being accepted by the user, as described above in connection with FIGS. 1A-1D.

As further shown in FIG. 6, process 600 may include receiving, from the user device, a message indicating an acceptance of the current version of the terms (block 660). For example, the version management platform (e.g., using computing resource 235, processor 320, memory 330, storage component 340, input component 350, communication interface 370, and/or the like) may receive, from the user device, a message indicating an acceptance of the current version of the terms, as described above in connection with FIGS. 1A-1D.

As further shown in FIG. 6, process 600 may include performing, after receiving the message, one or more additional verification procedures to determine that the user is who consented to the current version of the terms, wherein the one or more additional verification procedures verify that the user interacted with or authorized an interaction with the interface of the user device that accepted the current version of the terms (block 670). For example, the version management platform (e.g., using computing resource 235, processor 320, memory 330, storage component 340, input component 350, communication interface 370, and/or the like) may perform, after receiving the message, one or more additional verification procedures to determine that the user is who consented to the current version of the terms, as described above in connection with FIGS. 1A-1D. In some implementations, the one or more additional verification procedures may verify that the user interacted with or authorized an interaction with the interface of the user device that accepted the current version of the terms.

As further shown in FIG. 6, process 600 may include providing, to the user device and based on determining that the user is who consented to the current version of the terms, a notification indicating that the user consented to the current version of the terms to cause the user device to allow access to the program (block 680). For example, the version management platform (e.g., using computing resource 235, processor 320, memory 330, storage component 340, input component 350, communication interface 370, and/or the like) may provide, to the user device and based on determining that the user is who consented to the current version of the terms, a notification indicating that the user consented to the current version of the terms to cause the user device to allow access to the program, as described above in connection with FIGS. 1A-1D.

Process 600 may include additional implementations, such as any single implementation or any combination of implementations described below and/or in connection with one or more other processes described elsewhere herein.

In some implementations, the request may include a program identifier for the program. In some implementations, when obtaining the historical consent data, the version management platform may identify the one or more smart contracts by using the identifier associated with the account to search the distributed ledger. Additionally, the version management platform may obtain the historical consent data by providing the program identifier for the program as input to one or more smart contracts to cause the one or more smart contracts to output the historical consent data.

In some implementations, the user may share login credentials for the account with at least one of the one or more other users. In some implementations, the request to verify that the user has consented to the current version of the terms may include device information for the user device. In some implementations, when performing the first verification procedure, the version management platform may determine that the user device is linked to the user profile of the user based on the device information included in the request matching corresponding device information stored as part of the user profile. In some implementations, the version management platform may determine that the user consented to the current version of the terms based on determining that the user device is linked to the user profile of the user.

In some implementations, when receiving the message indicating the acceptance of the current version of the terms, the version management platform may receive, as part of the message, first identification data of an individual that accepted the current version of the terms. In some implementations, when performing the one or more additional verification procedures, the version management platform may determine, as part of a third verification procedure, that the first identification data satisfies a threshold level of similarity with second identification data that identifies the user. In some implementations, the version management platform may determine, as part of the third verification procedure, that the user consented to the current version of the terms based on determining that the first identification data satisfies the threshold level of similarity with the second identification data.

In some implementations, when performing the one or more additional verification procedures, the version management platform may provide, to the user device or to a particular account associated with the user and as part of a third verification procedure, a verification request message to confirm that the message indicating the acceptance of the current version of the terms was provided by the user. In some implementations, the version management platform may receive, from the user device or another device, a verification response message confirming that the message indicating the acceptance of the current version of the terms was provided by the user. In some implementations, the version management platform may determine, and as part of the third verification procedure, that the user consented to the current version of the terms based on receiving the verification response message confirming that the message indicating the acceptance of the current version of the terms provided by the user.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a node of a network, a request to verify that a user has consented to a current version of one or more terms associated with a program,
      wherein the network includes a plurality of nodes that have access to a distributed ledger that is used for managing a version control operation of the program, and
      wherein the request includes at least one of:
         an identifier associated with the user, or a program identifier of the program;
   obtaining, by the node of the network and by referencing the distributed ledger, historical consent data indicating a particular version of the one or more terms to which the user has previously provided consent;
   performing, by the node of the network, a first verification procedure to determine that the user has not consented to the current version of the one or more terms associated with the program,
      wherein the first verification procedure includes determining that the current version of the one or more terms is different than the particular version of the one or more terms to which the user has previously provided consent;
      providing, by the node of the network and to a user device, an indication that the user has not consented to the current version of the one or more terms to cause an interface of the user device to display the current version of the one or more terms in a manner capable of being accepted by the user,
   wherein the indication causes the user device to restrict access to the program;
   receiving, by the node of the network and from the user device, a message indicating an acceptance of the current version of the one or more terms;
   performing, by the node of the network and after receiving the message, a second verification procedure to determine that the user is who consented to the current version of the one or more terms;
   adding, by the node of the network and to the distributed ledger, a record indicating that the user consented to the current version of the one or more terms; and providing, by the node of the network and based on determining that the user is who consented to the current version of the one or more terms, a key to the user device that allows the user device to permit access to the program.

2. The method of claim 1, wherein the current version of the one or more terms and the particular version of the one or more terms are part of a terms of service (ToS) agreement for the program.

3. The method of claim 1, wherein the user is a first user of an account and shares login credentials for the account with a second user.

4. The method of claim 1, wherein the distributed ledger is implemented by a blockchain to provide secure, verifiable proof that the user consented to the current version of the one or more terms.

5. The method of claim 1, wherein the request to verify that the user has consented to the current version of the one or more terms includes device information for the user device; and wherein performing the second verification procedure comprises:
   determining that the user device is linked to a user profile of the user based on the device information included in the request matching corresponding device information stored as part of the user profile, and
   determining that the user consented to the current version of the one or more terms based on determining that the user device, which was used to provide the message indicating the acceptance of the current version of the one or more terms, is linked to the user profile of the user.

6. The method of claim 1, wherein receiving the message indicating the acceptance of the current version of the one or more terms comprises:
   receiving, as part of the message, first identification data of an individual that accepted the current version of the one or more terms; and
   wherein performing the second verification procedure comprises:
      determining that the first identification data satisfies a threshold level of similarity with second identification data that identifies the user, and
      determining that the user consented to the current version of the one or more terms based on determining that the first identification data satisfies the threshold level of similarity with the second identification data.

7. The method of claim 1, wherein performing the second verification procedure comprises:
   providing, to the user device or to a particular account associated with the user, a verification request message to confirm that the message indicating the acceptance of the current version of the one or more terms was provided by the user,
   receiving, from the user device or another device, a verification response message confirming that the message indicating the acceptance of the current version of the one or more terms was provided by the user, and
   determining that the user consented to the current version of the one or more terms based on receiving the verification response message confirming that the message indicating the acceptance of the current version of the one or more terms was provided by the user.

8. A node, comprising:
   one or more memories; and
   one or more processors, operatively coupled to the one or more memories, to:
      receive a request to verify that a user has consented to a current version of terms associated with a program,
         wherein the node is part of a network of nodes that have access to a distributed ledger that is used for managing version control of the program, and
         wherein the request includes an identifier associated with the user;
      obtain, using the distributed ledger, historical consent data indicating one or more versions of the terms to which the user has previously provided consent;
      perform a first verification procedure to determine that the user has not consented to the current version of the terms,
         wherein the first verification procedure includes determining that the current version of the terms is different than the one or more versions of the terms to which the user has previously provided consent;
provide, to a user device, an indication that the user has not consented to the current version of the terms to cause an interface of the user device to display the current version of the terms in a manner capable of being accepted by the user;
receive, from the user device, a message indicating an acceptance of the current version of the terms;
perform, after receiving the message, one or more additional verification procedures to determine that the user is who consented to the current version of the terms,
wherein the one or more additional verification procedures include at least one of:
a second verification procedure to verify that the user device is linked to a user profile of the user, or
a third verification procedure to verify that the user interacted with or authorized an interaction with the interface of the user device that accepted the current version of the terms; and
update the distributed ledger to include a record indicating that the user consented to the current version of the terms.

9. The node of claim 8, wherein the user is a first user of an account and shares login credentials for the account with a second user.

10. The node of claim 8, wherein the request to verify that the user has consented to the current version of the terms includes device information for the user device; and wherein the one or more processors, when performing the one or more additional verification procedures, are to:
determine, as part of the second verification procedure, that the user device is linked to the user profile of the user based on the device information included in the request matching corresponding device information stored as part of the user profile, and
determine, as part of the second verification procedure, that the user consented to the current version of the terms based on determining that the user device is linked to the user profile of the user.

11. The node of claim 8, wherein the one or more processors, when receiving the message indicating the acceptance of the terms, are to:
receive, as part of the message, first identification data of an individual that accepted the current version of the terms; and
wherein the one or more processors, when performing the one or more additional verification procedures, are to:
determine, as part of the third verification procedure, that the first identification data satisfies a threshold level of similarity with second identification data that identifies the user, and
determine, as part of the third verification procedure, that the user consented to the current version of the terms based on determining that the first identification data satisfies the threshold level of similarity with the second identification data.

12. The node of claim 8, wherein the one or more processors, when performing the one or more additional verification procedures, are to:
provide, to the user device or to a particular account associated with the user and as part of the third verification procedure, a verification request message to confirm that the message indicating the acceptance of the current version of the terms was provided by the user,
receive, from the user device or another device, a verification response message confirming that the message indicating the acceptance of the current version of the terms was provided by the user, and
determine, as part of the third verification procedure, that the user consented to the current version of the terms based on receiving the verification response message confirming that the message indicating the acceptance of the current version of the terms was provided by the user.

13. The node of claim 8, wherein the one or more processors, when performing the one or more additional verification procedures, are to:
perform the second verification procedure, and
perform the third verification procedure only if the second verification procedure fails.

14. The node of claim 8, wherein the distributed ledger is implemented by a tamper-resistant data structure to provide secure, verifiable proof that the user consented to the current version of the terms.

15. A non-transitory computer-readable medium storing one or more instructions, the one or more instructions comprising:
one or more instructions that, when executed by one or more processors of a node, cause the one or more processors to:
receive, from a user device, a request to verify that a user, of a group of authorized users of an account, has consented to a current version of terms associated with a program,
wherein the node is part of a network of nodes that have access to a distributed ledger that is used for managing version control of the program, and
wherein the request includes an identifier associated with the account;
obtain, using the distributed ledger, historical consent data indicating one or more versions of the terms to which the group of authorized users have previously provided consent;
perform a first verification procedure to determine that the user device that provided the request is linked to a user profile of the user;
perform, using the historical consent data associated with the user, a second verification procedure to determine that the user has not consented to the current version of the terms,
wherein the second verification procedure includes determining that the current version of the terms is different than the one or more versions of the terms to which the group of authorized users have previously provided consent;
provide, to the user device, an indication that the user has not consented to the current version of the terms to cause an interface of the user device to display the current version of the terms in a manner capable of being accepted by the user;
receive, from the user device, a message indicating an acceptance of the current version of the terms;
perform, after receiving the message, one or more additional verification procedures to determine that the user is who consented to the current version of the terms,
wherein the one or more additional verification procedures verify that the user interacted with or authorized an interaction with the interface of the user device that accepted the current version of the terms; and provide, to the user device and based on determining that the user is who consented to the current version of the terms, a notification indicating that the user consented to the current version of the terms to cause the user device to allow access to the program.

16. The non-transitory computer-readable medium of claim 15, wherein the request includes a program identifier for the program; and wherein the one or more instructions, that cause the one or more processors to obtain the historical consent data, cause the one or more processors to:

identify one or more smart contracts by using the identifier associated with the account to search the distributed ledger, and obtain the historical consent data by providing the program identifier for the program as input to one or more smart contracts to cause the one or more smart contracts to output the historical consent data.

17. The non-transitory computer-readable medium of claim 15, wherein the user shares login credentials for the account with at least one of the group of authorized users.

18. The non-transitory computer-readable medium of claim 15, wherein the request to verify that the user has consented to the current version of the terms includes device information for the user device; and wherein the one or more instructions, that cause the one or more processors to perform the first verification procedure, cause the one or more processors to:

determine that the user device is linked to the user profile of the user based on the device information included in the request matching corresponding device information stored as part of the user profile, and determine that the user consented to the current version of the terms based on determining that the user device is linked to the user profile of the user.

19. The non-transitory computer-readable medium of claim 15, wherein the one or more instructions, that cause the one or more processors to receive the message indicating the acceptance of the current version of the terms, cause the one or more processors to:

receive, as part of the message, first identification data of an individual that accepted the current version of the terms; and wherein the one or more instructions, that cause the one or more processors to perform the one or more additional verification procedures, cause the one or more processors to:

determine, as part of a third verification procedure, that the first identification data satisfies a threshold level of similarity with second identification data that identifies the user, and determine, as part of the third verification procedure, that the user consented to the current version of the terms based on determining that the first identification data satisfies the threshold level of similarity with the second identification data.

20. The non-transitory computer-readable medium of claim 15, wherein the one or more instructions, that cause the one or more processors to perform the one or more additional verification procedures, cause the one or more processors to:

provide, to the user device or to a particular account associated with the user and as part of a third verification procedure, a verification request message to confirm that the message indicating the acceptance of the current version of the terms was provided by the user, receive, from the user device or another device, a verification response message confirming that the message indicating the acceptance of the current version of the terms was provided by the user, and determine, and as part of the third verification procedure, that the user consented to the current version of the terms based on receiving the verification response message confirming that the message indicating the acceptance of the current version of the terms provided by the user.

* * * * *